Figure 10:
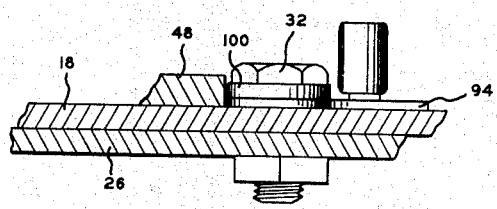

May 25, 1965  R. F. WELSH  3,185,525
SEAT HINGING MECHANISM
Filed June 1, 1962  4 Sheets-Sheet 1
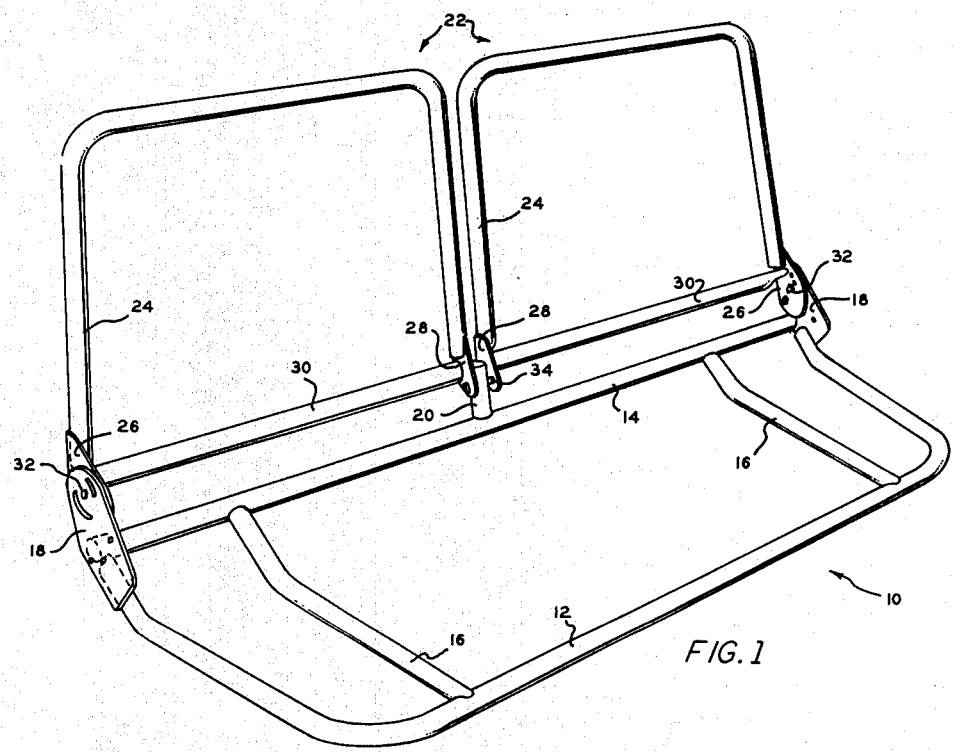
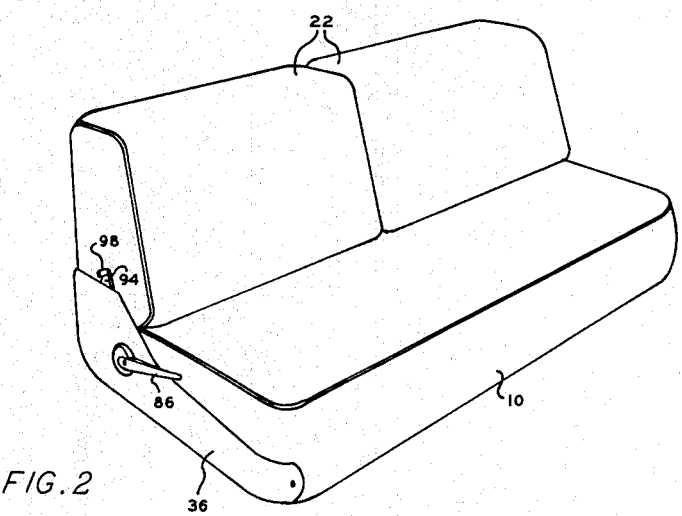
INVENTOR
RALPH F. WELSH
BY Beaman & Beaman
ATTORNEY May 25, 1965 R. F. WELSH 3,185,525
SEAT HINGING MECHANISM
Filed June 1, 1962 4 Sheets-Sheet 2

INVENTOR
RALPH F. WELSH
BY Beaman & Beaman
ATTORNEY

INVENTOR
RALPH F. WELSH

BY Beaman & Beaman
ATTORNEY

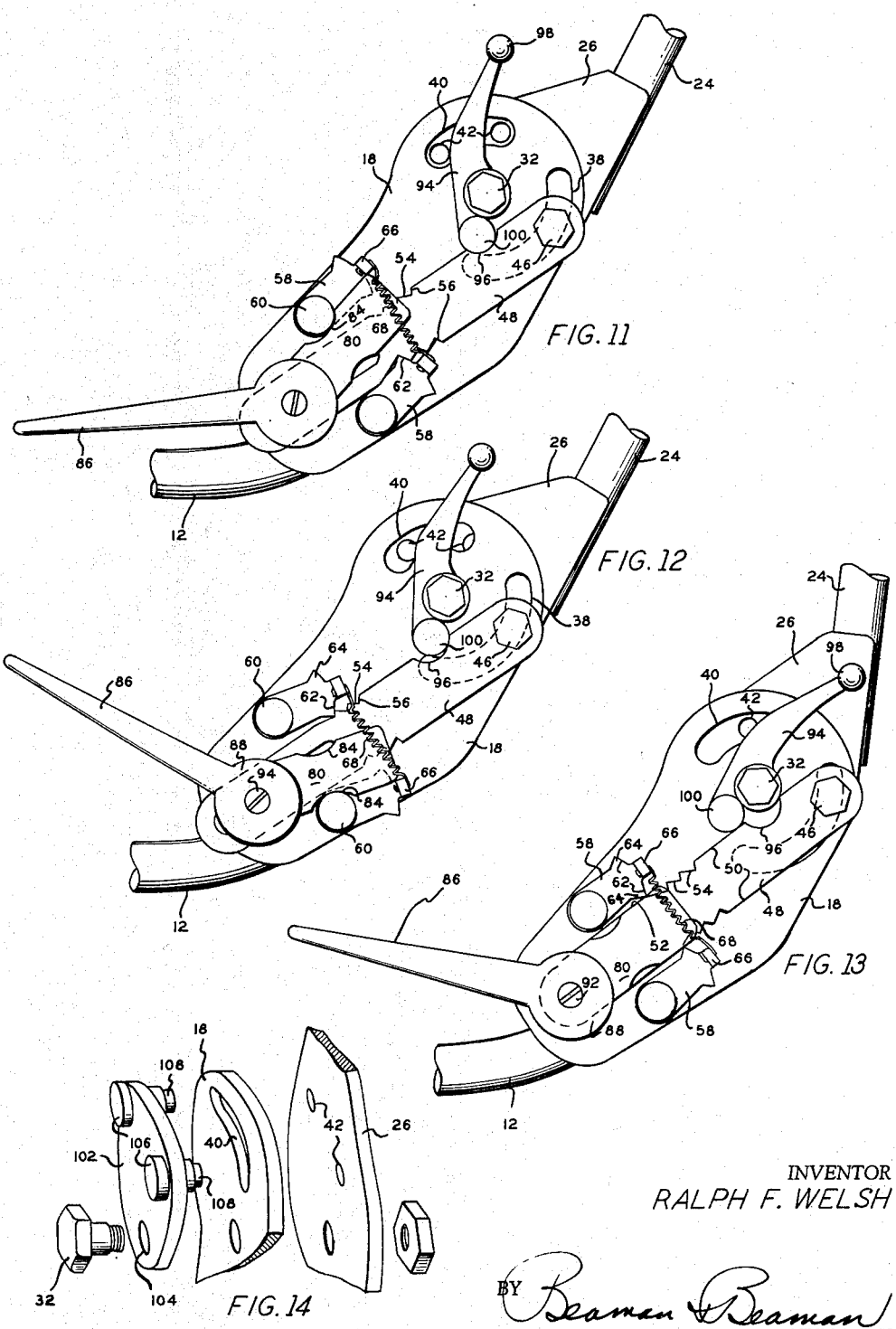

United States Patent Office 3,185,525
Patented May 25, 1965

3,185,525
SEAT HINGING MECHANISM
Ralph F. Welsh, Blissfield, Mich., assignor, by mesne assignments, to Hoover Ball and Bearing Company, Saline, Mich., a corporation of Michigan
Filed June 1, 1962, Ser. No. 199,396
8 Claims. (Cl. 297—367)

The invention pertains to seat hinging mechanism and particularly relates to hinging mechanism permitting adjustability between the angular relationship of the seat and back portions of seating devices, and is particularly adapted for use with, though not limited to, vehicle seat structure.

Seating structure, including a seat or lower portion and a back portion whereby the back portion may be pivoted with respect to the seat portion, is well known. Such construction has the advantage of permitting the occupant to adjust the seat mechanism to the most comfortable position and provides a highly desirable feature in seating structures. In the vehicle seat art reclining seats have long been in existence, and one of the features of some known seats is the ability of the back portion to pivot back to a position wherein the seat and back portions, together, substantially define a continuous surface. Such a construction permits the seats of an automobile, for instance, to convert into a bed for overnight accommodation. While automobile seat constructions permitting the above-described full reclining of the back portion to define a continuous surface with the seat portion are common, known constructions do not provide for means for tilting the back portion forwardly from the normal position so as to provide access to the rear of a two-door vehicle for exit or entering.

It is an object of the invention to provide a seating mechanism wherein seat adjustment apparatus is employed to permit adjustable reclining of the back portion and also permit the back to be tilted forwardly with respect to a normal upright position to permit entry to or exit from the rear seat of a vehicle.

Another object of the invention is to provide seating mechanism permitting reclining of the back portion whereby adjustment of the back portion is incremental and positive locking.

A further object of the invention is to provide seating structure permitting a wide range of seat adjustment wherein the structure is formed of economical stamped parts, and may be readily manufactured and assembled.

Another object of the invention is to provide a universal seating structure which may be employed with both tilting and nontilting seats and right and left pivot locations, which is of economical manufacture, and may be used with different types of seat frames.

A further object of the invention is to provide a reclining seat structure which may also be tilted forward from a normal position, and wherein releasable locking means are employed to prevent such forward tilting unless desired.

Figure 8:
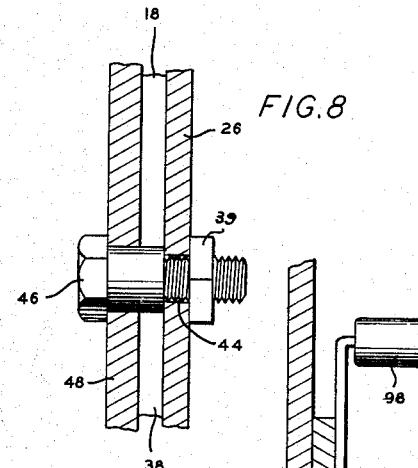
Figure 9:
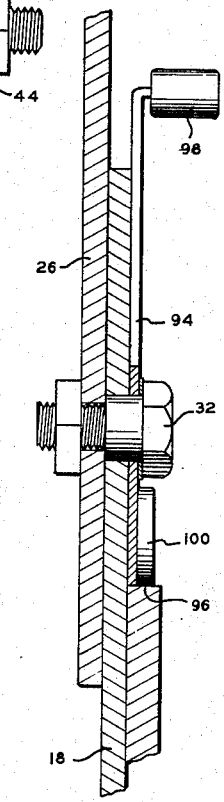
Figure 3:
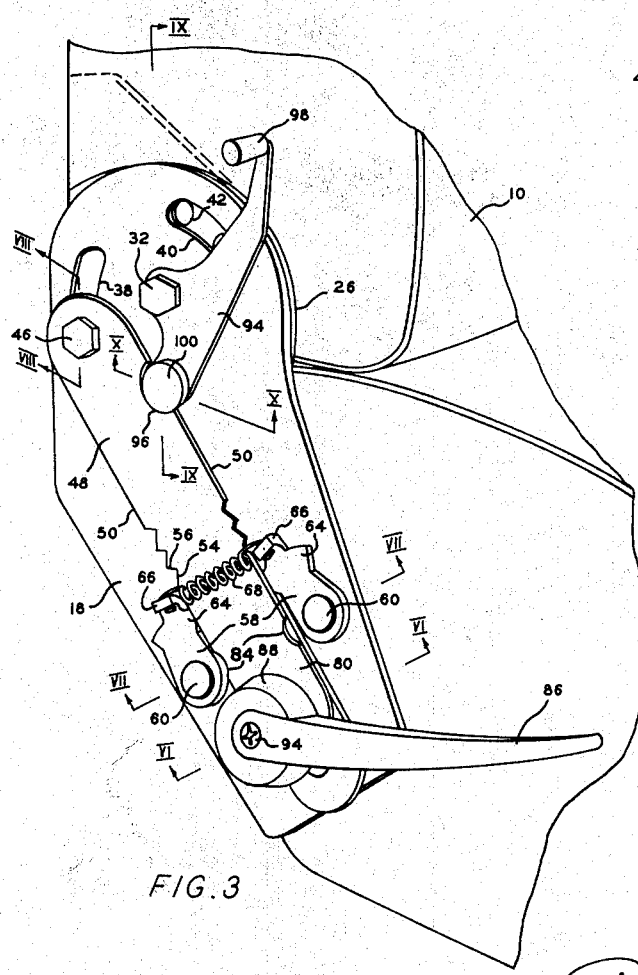
Figure 5:
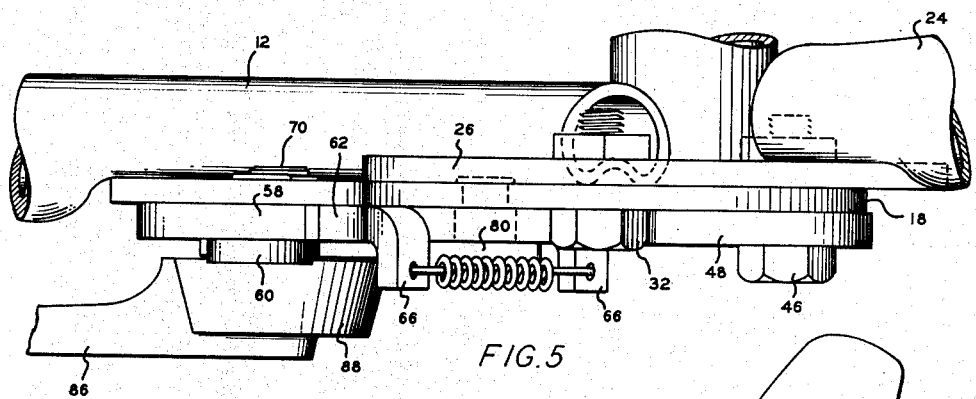
Figure 6:
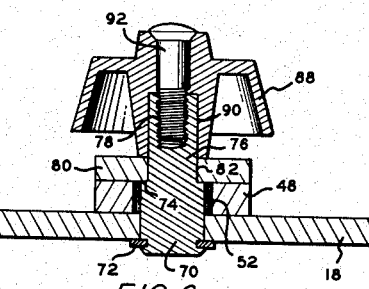
Figure 4:
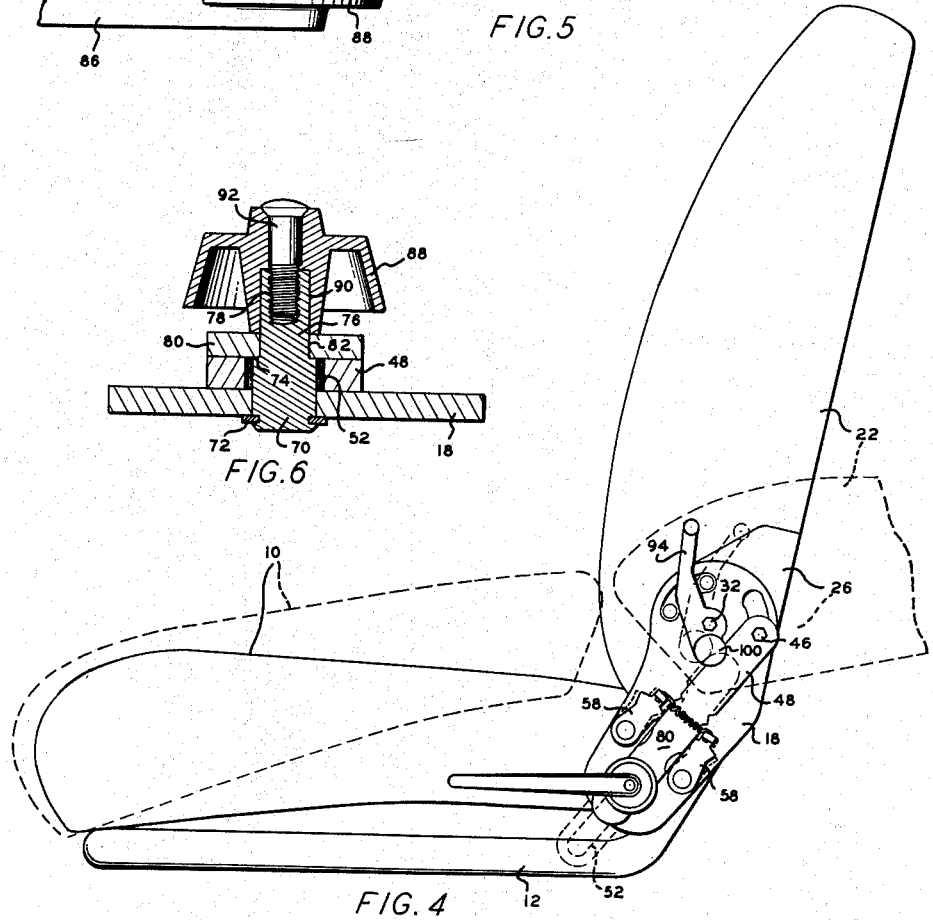
Figure 7:
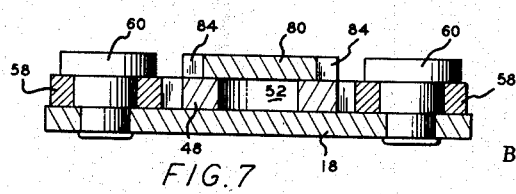

These and other objects of the invention arising from the details and relationships of the components of an embodiment will be apparent from the following description and accompanying drawings wherein:

FIG. 1 is a perspective view of a basic seat frame, having a two-part back portion, with which the invention may be employed, FIG. 2 is a perspective view of a complete seat structure, having a two-part back portion and employing the invention, FIG. 3 is an enlarged detail view of the seat-adjusting structure for the right side of the seat in perspective, FIG. 4 is an elevational view of the left side of a seat employing the invention, illustrating a normal back position in full lines, and a full reclined position in dotted lines, FIG. 5 is a top plan enlarged detail view of the adjustment structure of FIG. 4, not illustrating the forward tilt lock lever, FIG. 6 is a sectional view of the actuating shaft taken along section VI—VI of FIG. 3, FIG. 7 is a sectional view taken through the ratchet dog pivot shafts along section VII—VII of FIG. 3, FIG. 8 is an elevational, detail, sectional view taken along section VIII—VIII of FIG. 3, FIG. 9 is an elevational, sectional, detail view taken along section IX—IX of FIG. 3, FIG. 10 is a sectional detail view taken along section X—X of FIG. 3, FIG. 11 is an elevational view of the adjusting apparatus showing the reclining adjustment actuating handle in the downward position, FIG. 12 is a view similar to FIG. 11 showing the adjustment actuating handle in the upward position, FIG. 13 is an elevational view of the adjusting apparatus, illustrating the forward tilting locking lever removed from its abutment notch, and the seat portion in a partial forward tilting position, and FIG. 14 is a detail, exploded, perspective view of an optionally employed locking member and the seat components associated therewith.

As the invention finds particular use with automotive seat structure, the description thereof is in conjunction with this type of seat, and is shown as in FIGS. 1 and 2 as employed with a seat having a two-part back portion of the type common in two-door vehicles having rear seating facilities.

FIG. 1 illustrates the basic frame components employed in a typical structure employing the invention. The seat structure includes a lower or seat portion 10 defined by a U-shaped tubular frame member 12 and a rear frame member 14 connected by reinforcing members 16. Plates 18 are welded, or otherwise conventionally affixed, to the frame members 12 and 14 so as to become an integral part of the seat portion. An upwardly extending tubular stud 20 is affixed to the rear frame 14.

The back portions 22 each include a U-shaped tubular member 24 having plates 26 and 28 affixed thereto by welding or other connecting means. A lower tubular frame member 30 may be interposed between the plates 26 and 28. A shouldered pivot pin bolt 32 pivotally interconnects the plates 18 and 26 through appropriate holes. Likewise, a pivot pin 34 interconnects the plates 28 to the frame stud 20 so that the back seat portions 22 may pivot about the axis of the pins 32 and 34 relative to the seat portion 10. The plates 18 are provided with arcuate slots, as illustrated, which will be more fully described.

Conventional spring and cushioning means are mounted upon the seat and back portions of the seating framework illustrated in FIG. 1, and upon complete assembly of the seating structure, having the reclining and tilting features herein described, the seating apparatus may have a final form such as shown in FIG. 2. A cover cowl 36 is employed to shield the adjusting structure and provide an attractive over-all appearance.

The plates 18 are provided with a pair of arcuate slots 38 and 40 concentric with the pivot pin 32, FIG. 3. The plates 26 are provided with a pair of holes 42 equidistantly located from the pivot pin 32, and align with the slot 40 at the normal upright position of the back portions 22 relative to the seat portion. The plate 26 is also provided with a hole 44, FIG. 8, for receiving a threaded and shouldered bolt 46 which extends through the slot 38 and threads into weld nut 39, and pivotally interconnects one end of a locking bar 48 to the back portion plates 26.

It will be appreciated that although the above frame members are described as "tubular," they may be of any type manufacture such as a rolled or stamped construction.

The locking bar 48 is of an elongated configuration having substantially parallel, longitudinal sides 50, and the end removed from the bolt 46 is provided with a longitudinally extending, centrally disposed slot 52, FIGS. 4 and 6. A plurality of notches 54 are defined in the locking bar longitudinal sides 50. The configuration of these notches will be apparent from FIGS. 11 through 13, and include abutment surfaces 56. The abutment surfaces 56 of the notches on opposed sides of the locking bar are axially displaced at predetermined distances relative to the surfaces on the opposite side of the bar and these abutment surfaces determine the position of the back portion during adjustment. Thus, by positioning the notches and the abutment surfaces 56 as desired, the increments of reclining positions may be readily and accurately determined.

A pair of ratchet dog members 58 are pivotally mounted on each plate 18. A dog is mounted on each side of the locking bar 48 for pivoting about a pin 60 fixed within the plate 18, FIG. 7. The dogs 58 are of symmetrical configuration whereby they may be used on either side of the locking bar interchangeably, and include abutment surfaces 62 defined upon projections 64. Each dog also includes a projection 66 extending away from the plate 18, having a hole defined therein for receiving the end of a spring 68. The tension spring 68 will bias the dogs toward each other and into constant engagement with the locking bar 48.

A shouldered shaft 70 is rotatably mounted upon the plate 18, FIG. 6. The shaft 70 is provided with an annular groove for receiving a snap ring 72, a shoulder 74, and a square cross section stem 76. The stem 76 is provided with an internal threaded bore 78.

The shaft 70 extends through the locking bar slot 52, and a dog release lever 80, having a square hole 82, is nonrotatably fixed to the shaft due to the close mating between the square hole 82 and the square stem 76. The release levers 80 lies upon the locking bar and is provided with recessed portions 84 for preventing premature engagement with the dog pivot pins 60. The outer end of the dog release lever 80 lies between the dog projections 66, for selective engagement therewith, and the spring 68 extends over this end of the release lever.

An actuating handle 86, having an enlarged and decorative hub 88 provided with a square hole 90, is also mounted upon the shaft stem 76, and is maintained thereon by a screw 92 cooperating with the threaded bore 78. Thus, it will be appreciated that the shaft 70 may be rotatably oscillated by the handle 86, and such oscillation of the shaft 70 will produce angular movement of the dog release lever 80.

Operation of the reclining adjustable apparatus is as follows:

Assuming the seat portion 10 and the back portion 22 to be in a normal upright, angular relationship, as shown in the full lines in FIG. 3, i.e., the back portion is not reclined nor tilted forward, at this position the notch abutment surface 56 most remote from the bolt 46 will be engaged by the abutment surface 62 of a dog 58. Any tendency for the back portion 22 to tilt backwardly will cause plate 26 to rotate and axially translate the locking bar 48 toward the dogs 58. Due to the interengagement of a dog with a notch, such rotation of the back portion 22 is positively prevented. If it is desired to recline the back portion, the occupant grasps the handle 86 and rotates the shaft 70 in a direction which will cause the release lever 80 to engage projection 66 of the operative dog 58 and disengage the engaging abutment surfaces of the dog and notch, see FIG. 11 where the upper dog has just been removed from a notch. Disengagement of the dog and notch will permit the locking bar to axially shift toward the dogs a distance determined by the locking bar longitudinal axial distance between the abutment surface 62 of the notch just engaged and the notch abutment surface on the opposite side of the locking bar opposed to the abutment surface of the dog not engaged by lever 80. Upon sufficient rotation of the back portion 22 causing sufficient axial movement of the locking bar to engage the aforementioned opposed notch and dog abutment surfaces, the next position of the back portion 22 will be locked.

If the occupant desires to further recline the seat, the handle 86 is rotated in the opposite direction than before disengaging the operative dog, permitting the nonreleased dog to engage the next notch abutment surface opposed thereto to again determine a back portion adjustment position, FIG. 12. It will be appreciated that the abutment surfaces 56 of the notches on opposite sides of the locking bar are so related that during axial shifting of the locking bar the abutment surface 56, just engaged by a dog, will move beyond the dog-abutment surface 62 so that at each operative position of each dog a different notch will be engaged.

If the occupant desires to adjust the back portion from the full-lined position of FIG. 4 to the fully reclined position, shown in dotted lines, the operating handle 86 must be oscillated back and forth so the back portion will recline incrementally rather than move to the full reclined position in one swift movement. The incremental adjustment is important from a safety standpoint. To provide continuity of the surfaces of the seat and rear portions, as shown in dotted lines in FIG. 4, the rear of the seat portion must be raised and known seat lifting apparatus may be used for this purpose.

As the abutment surfaces 56 may be precisely located upon the locking bar and the locking action produced by the apparatus is positive, the positioning of the notches, and associated surfaces 56, nearest the slot 52 may be such that the initial increments of adjustment only change the angle of the back portion 22 by a few degrees. Such accurate and incremental adjustment is particularly desirable for the vehicle driver to permit a seat adjustment to be obtained providing maximum comfort for each individual. As the number of adjustable positions may be widely varied merely by predetermining the location of the notches 54, the requirements and specifications of various vehicle manufacturers may be readily met without significantly modifying the seat adjusting structure.

To move the back portion 22 from a reclined position to a forward position, the occupant will grasp the top of the back portion and pull forwardly. This motion will rotate the plate 26 and translate the locking bar in the direction causing the dogs 58 to "ride over" the notches 54. Forward movement of the rear portion continues until limiting means are encountered. One form of limiting means may constitute merely the engagement of the end of the slot 52 with the shaft 70.

In using the apparatus of the invention with a two-door vehicle, it is desirable to tilt the back portion 22 forwardly from the normal full-line position shown in FIG. 4. To this end a lever 94 is employed in conjunction with a recess 96 defined in the upper lateral side 50 of the locking bar. The lever 94 is pivotally mounted upon the pivot pin 32, and includes a handle portion 98 at one end and an enlarged abutment head 100 at the other end. The arcuate recess 96 is so defined in the locking bar 48, and so dimensioned that the head 100 and recess will engage at that point of the plate 26 during forward pivoting to locate the normal position of the back portion, as shown in FIG. 4. The lever 94 does not interfere with the above-described reclining operation in that as the locking bar 48 moves toward the dogs 58, the recess 96 will pivot the lever 94 clockwise, as shown in FIG. 12. Continued reclining of the seat back portion causes the head 100 to completely ride out of the recess 96, as shown in dotted lines in FIG. 4.

With the abutment head 100 within the recess 96, it will be apparent that tilting of the back portion 22 forwardly from the position of FIGS. 3 or 4 is prevented as the interaction of the head and recess prevents clockwise movement of the plate 26, as shown in FIG. 3. Upon grasping the handle 98 and rotating the lever 94 to disengage the head 100 from the recess 96, the back portion 22 may be then tilted forwardly, as shown in FIG. 13. If desired, spring means may be employed with the lever 94 to bias the same in a direction which will maintain engagement of the head 100 with the locking bar 48, whereby upon returning the seat back to its normal position, engagement of the head and recess will be assured. Locking of the seat back against forward tilting has a safety value in that it prevents the seat from tilting forward upon sudden stopping of the vehicle. The forward tilting of the back portion will be limited by engagement of the pivot pin 32 with the edge of recess 96.

An important feature of the invention lies in the ability of the disclosed plate structures 18 and 26 to be employed with a wide variety of seat constructions. For instance, if a seat construction is desired which does not employ adjustment features between the seat and back portions, a construction as shown in FIG. 1 may be employed wherein the tubular frame components are welded to the plates 18 and 26, but no adjusting structure is mounted upon the plates. In this construction, an adaptor locking plate 102, FIG. 14, is employed to lock the plates 18 and 26 against relative rotation. As described above, a pair of holes 42 are located within the plate 26 and aligned with the slot 40. The adaptor plate 102 includes a hole 104 for cooperation with the pivot pin 32, and a pair of shouldered studs 106 extend from the adaptor plate. The studs 106 include reduced portions 108 which are closely received within the holes 42 and the shoulder portions will engage the radiused ends of the slot 40. Thus, upon the plates 102, 18, and 26 being in maintained assembled relation by the pivot pin 32, it will be appreciated that relative rotation between plates 18 and 26 will be prevented. For purpose of manufacture, the plate 26 may always be provided with the holes 42 and the defined hole 44. This construction permits manufacturing costs to be reduced, yet enables a single basic structure to be employed with either adjustable or nonadjustable seats.

If it is desired to produce a seat capable of reclining adjustment, but the forward tilting beyond the normal position is not required, the lever 94 may be eliminated and the forward movement of the back portion may be limited by any abutment relation, such as the engagement of slot 52 and shaft 70 or bolt 46 with the end of slot 38. Also, the forward tilting feature may be retained without employing the locking lever 94. In such a construction no means would be provided for producing a positive stop at the normal position of the back portion, and only the notch and dog engagement would determine the normal seat position.

It will be appreciated that various modifications to the invention may be apparent to those skilled in the art without departing from the spirit and scope thereof, and it is intended that the invention be defined only by the following claims.

I claim:

1. Seat adjusting apparatus for a seat, having a seat portion and a back portion, pivot means pivotally connecting said back portion to said seat portion, an elongated lock member mounted on said seat portion for longitudinal axial displacement thereto, a pivot member mounted on said back portion adapted to rotate about the axis of said pivot means upon relative pivoting of said seat portion, said lock member being eccentrically connected to said pivot member with respect to said pivot means so that pivoting of said back portion axially translates said lock member, and means mounted on said seat portion selectively operably associating with said lock member for restraining said lock member against axial longitudinal movement relative to said seat portion.

2. In a seat adjusting apparatus as in claim 1 wherein a forward pivot lock member is interposed between said seat portion and said back portion preventing pivotal movement of said back portion forwardly from a normal angular position of said back portion relative to said seat portion and means selectively rendering said forward pivot lock member inoperative to permit pivoting of said back portion forward of said normal position.

3. In seat adjusting apparatus as in claim 1, wherein said lock member comprises a bar having oppositely disposed longitudinal sides, notches defined in said sides, and ratchet dog members pivotally mounted on said seat portion selectively engageable with said notches constituting said means operably associating with said lock member.

4. In seat adjusting apparatus as in claim 3, wherein a ratchet dog release lever is mounted on said seat portion, and an operating handle is operatively associated with said release lever.

5. In a seat adjusting apparatus for a seat, having a seat portion and a back portion, pivot means pivotally mounting said back portion upon said seat portion, an elongated lock member including oppositely disposed longitudinal sides mounted upon said seat portion for longitudinal movement thereto, means pivotally connecting said lock member to said back portion eccentrically with respect to said pivot means whereby pivoting of said back portion longitudinally translates said lock member, ratchet teeth defined in said longitudinal lock member sides, a ratchet dog pivotally mounted on said seat portion adjacent each of said longitudinal sides, biasing means biasing said dogs toward said teeth whereby said dogs selectively engage said teeth for restraining pivoting of said back portion rearwardly with respect to said seat portion, and dog release means mounted upon said seat portion.

6. In a seat adjusting apparatus as in claim 5, wherein a longitudinally extending slot is defined in said lock member, a shaft mounted on said seat portion and slidably received within said slot guiding movement of said lock member upon said seat portion, said dog releasing means being mounted upon said shaft.

7. In a seat adjusting apparatus as in claim 5, wherein releasable forward pivoting restraining lock means is movably mounted upon said seat portion, and an abutment defined on said lock member selectively engageable by said releasable lock means whereby said releasable lock means may be positioned relative to said abutment to selectively permit or prevent forward pivoting of said back portion relative to said seat portion beyond a predetermined position.

8. In a seat adjusting apparatus as in claim 5, wherein a longitudinally extending slot is defined in said lock member, a shaft mounted on said seat portion and slidably received within said slot guiding movement of said lock member upon said seat portion, said dog release means including a dog release lever mounted upon said shaft selectively engageable with said ratchet dogs, and a handle operatively associated with said dog release lever.

References Cited by the Examiner

UNITED STATES PATENTS

| Re. 24,528 | 9/58 | Borisch | 297—369 |
|---|---|---|---|
| 3,008,765 | 11/61 | Tischler | 297—367 |
| 3,079,199 | 2/63 | Tischler | 297—367 |

FRANK B. SHERRY, *Primary Examiner.*